United States Patent [19]

Pagella

[11] 3,782,501
[45] Jan. 1, 1974

[54] LUBRICATING-OIL CONTROL DEVICE FOR USE IN MACHINES, FOR INSTANCE MACHINE TOOLS

[75] Inventor: Elio Pagella, Ivrea, Italy

[73] Assignee: Ing. C. Olivetti & C., S.p.A., Turin, Italy

[22] Filed: Feb. 22, 1971

[21] Appl. No.: 117,261

[30] Foreign Application Priority Data
Mar. 5, 1970 Italy ............................... 67736 A/70

[52] U.S. Cl. ............................... 184/6.4, 340/270
[51] Int. Cl. ............................................. F01m 11/12
[58] Field of Search ..................... 340/270, 239 R; 184/6.4, 1 C, 6.14; 116/117; 137/551, 557

[56] References Cited
UNITED STATES PATENTS

| | | | |
|---|---|---|---|
| 3,583,437 | 6/1971 | Mastroianni et al. | 137/558 |
| 2,751,044 | 6/1956 | Harris | 184/6.4 |
| 2,713,678 | 7/1955 | Krokstrand | 340/239 |
| 3,358,790 | 12/1967 | Krudewig | 184/6.4 |
| 3,507,359 | 4/1970 | Warnock | 340/270 X |
| 2,934,861 | 5/1960 | Engel | 184/6.4 X |
| 2,675,514 | 4/1954 | Smith | 184/6.4 X |
| 2,676,315 | 4/1954 | Kyle | 184/6.4 X |
| 2,543,784 | 3/1951 | Kyle | 184/6.4 |

*Primary Examiner*—Manuel A. Antonakas
*Attorney*—Birch, Swindler, McKie & Beckett

[57] ABSTRACT

A machine control device for arresting the operation of a machine in response to an insufficient rate of lubricant flow in the machine lubrication system. A chamber interposed in the lubricant return circuit to the reservoir comprises a float for sensing the level of lubricant therein, an upper discharge port, and a lower discharge port of such size as to allow a flow equal to that necessary in the lubrication system to allow the machine to complete its cycle. A signal responsive to a predetermined position of the float announces the condition of insufficient rate of flow, and provides an input to an AND gate. The other input to the AND gate is provided by the machine control system at the end of a cycle, whereby the arresting of machine operation thereupon occurs.

4 Claims, 4 Drawing Figures

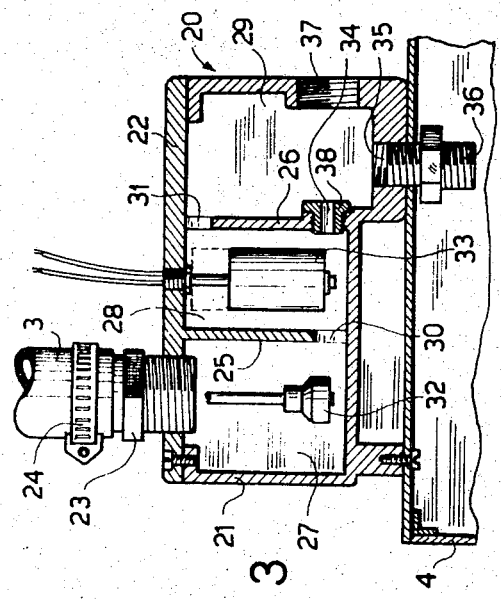
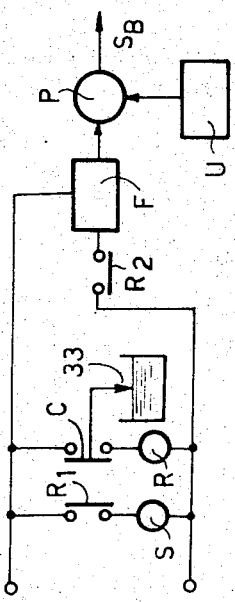
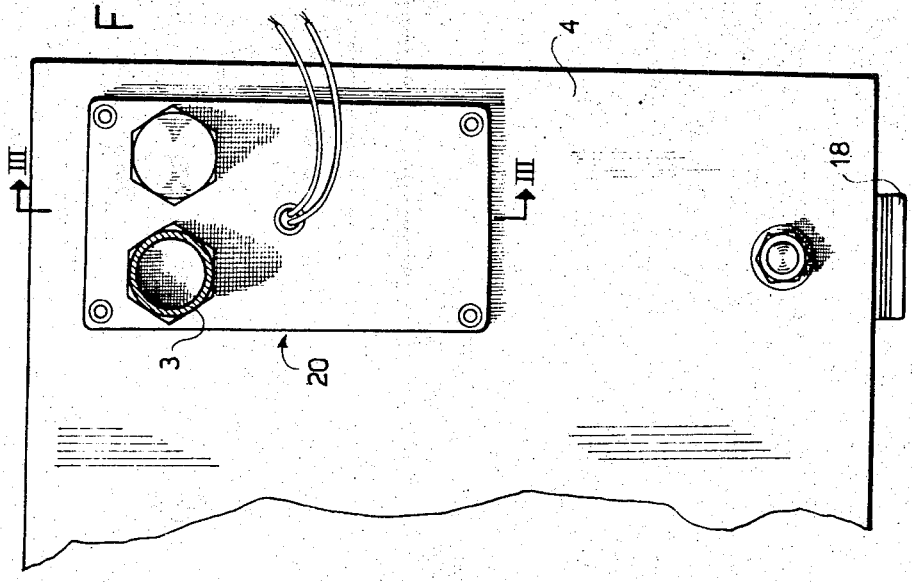

3,782,501

LUBRICATING-OIL CONTROL DEVICE FOR USE IN MACHINES, FOR INSTANCE MACHINE TOOLS

BACKGROUND OF THE INVENTION

This invention relates to the lubricating-oil circuits of machines and more particularly to a device for control of the lubricating oil for use in machine tools.

As is well known, in the lubricating-oil circuits of machine tools essentially comprise a small hydraulic pumping station provided with pumps and filters, pipings connecting this station with the part or the parts of the machine tool to be lubricated, and a device responsive to the pressure of the lubricating oil. This responsive device is adapted to indicate any pressure drop of the oil in the circuit and can be arranged to stop the operation of the machine tool as a result of a pressure drop. However, the control of the oil pressure in the lubricating circuits utilizing devices of the aforementioned kind has proved to be not quite satisfactory. The operation of the pressure indicating devices, at the pressures usually employed in the lubricating circuits of machine tools, is rather erratic.

Moreover, while the known devices are able to detect certain irregularities in the oil circulation, due to pressure drops in the circuit caused, for instance, by leaks in the pipings or clogging of the filters, they do not detect those anomalies which, although causing a reduction of the flow rate of the oil, are not accompanied by a sensible reduction of the oil pressure, such as obstructions of the pipings.

Finally, the pressure indicating devices are rather expensive and also are highly delicate devices, so that they are easily damaged by particles of contaminating matter present in the lubricating oil.

SUMMARY OF THE INVENTION

According to the present invention, there is provided a device for the control of the lubricating oil of a machine comprising a reservoir of oil, a pump for sending the oil through a delivery circuit and a return circuit back to the reservoir, and oil detecting or indicating means disposed in the oil return circuit.

The detecting or indicating means may be responsive to the return oil rate of flow, or may be placed in a chamber of predetermined capacity disposed in the return circuit, and are adapted to deliver an electric signal upon lowering of the oil level in the chamber caused by a reduction of the rate of flow of the oil in the circuit, delay means being provided for generating a signal for arresting the machine when the signal is produced at the end of an operating cycle of the machine.

BRIEF DESCRIPTION OF THE DRAWINGS

The invention will be described in more detail, by way of example, with reference to the accompanying drawings, in which:

FIG. 2 is a plan view, partly in section, of a part of the pumping station of FIG. 1;

FIG. 3 is a vertical section of the device; and

FIG. 4 shows an electric circuit for control of the program unit of the machine tool.

DESCRIPTION OF THE PREFERRED EMBODIMENT

Figure 1:
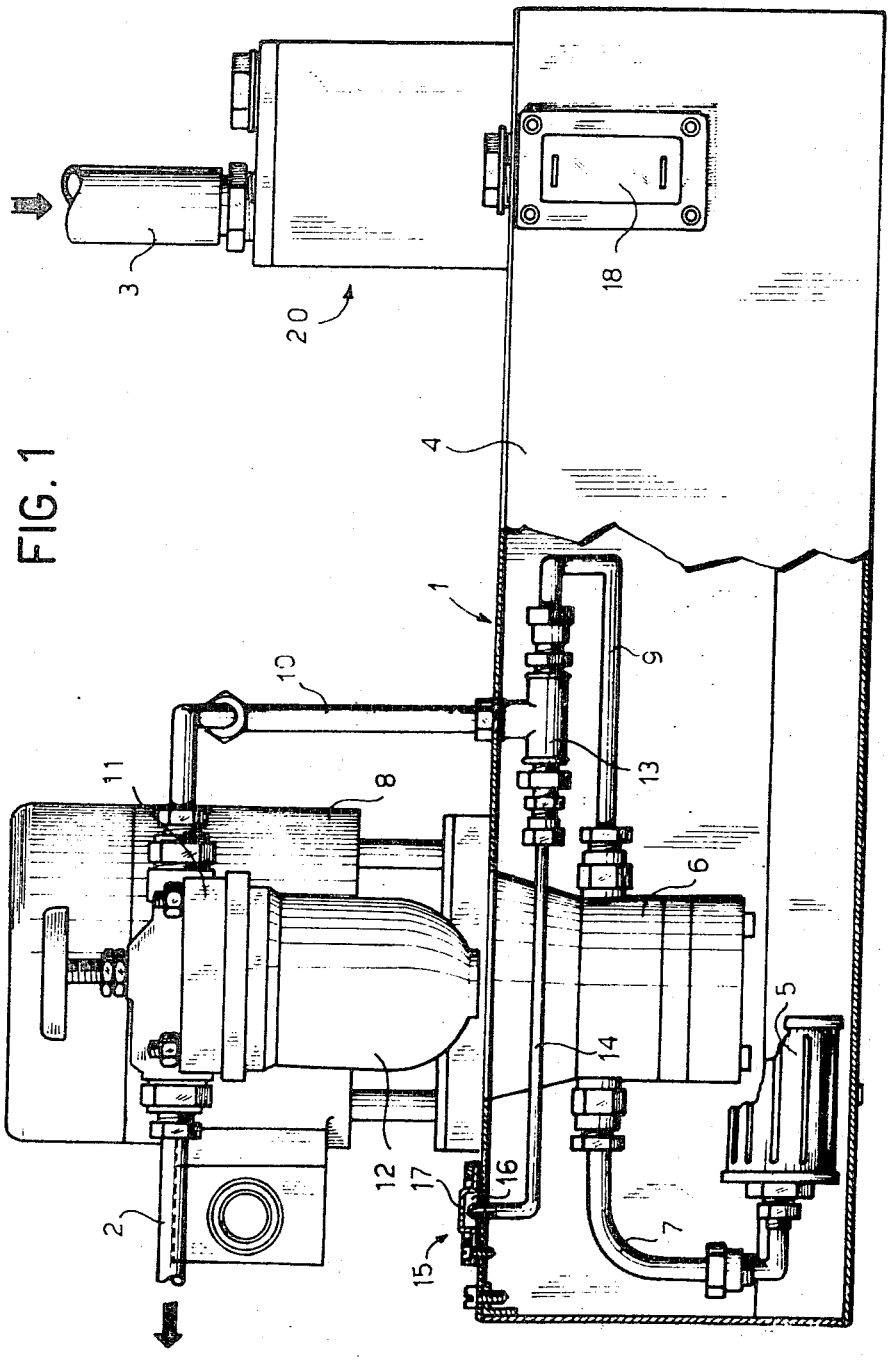
FIG. 1 shows a side view, partly in section, of the pumping station of a lubricating circuit of a machine tool.

With reference to FIG.1, the lubricating-oil circuit comprises a pumping station 1, and pipings 2 and 3 for delivery and return of the oil respectively; (only the initial and the final sections of these pipings are shown). The delivery piping 2 is connected with one or more parts or components (not shown) of a machine tool to be lubricated, normally one or more operating heads.

The pumping station 1 comprises a reservoir 4 for the oil, inside which a filter 5 and a pump 6 are disposed. The pump is connected with the filter by means of a pipe section 7 and is actuated by an electric motor 8, fastened to the upper wall of the reservoir 4.

The outlet of the pump 6 is connected by means of pipe sections 9 and 10 with a filter 11 which has a filter element housed in a transparent casing 12 and to which the oil delivery piping 2 is directly fastened.

The pipe section 9 is also in communication, by means of a fitting 13, with a small tube 14 adapted for feeding a visual indicator 15 of the oil circulation, whish is fastened to the upper wall of the reservoir 4. This indicator, of known kind, comprises a chamber 16 closed by a transparent cover 17, inside which the oil can circulate.

A side wall of the oil reservoir 4 is provided with a small window 18 through which it is possible to observe the level of the oil inside the reservoir.

A control device 20 is disposed on the upper wall of the reservoir 4, downstream of the oil return piping 3. The device 20 comprises a housing or casing 21 (FIG. 3) closed by an upper cover 22. To cover 22 a threaded fitting 23 is secured, which receives the end of the piping 3, fastened thereon by means of a clamp 24.

Two walls 25 and 26 partition a series of three chambers 27, 28 and 29, each of which is in communication with the subsequent one, through holes 30 and 31 provided in the walls 25 and 26. The piping 3 opens into the chamber 27, where a magnetic plug 32 is disposed in any suitable manner. In the chamber 28 a float 33 is housed, which is adapted to actuate upon its displacement (in vertical direction as seen in FIG. 3), a contact incorporated therein (not shown). In the wall 26, besides the hole 31 disposed at the top, another hole 34 is provided below, while in the bottom wall of the housing 21 a third hole 35 is provided, through which the chamber 29 is in communication with the inside of the reservoir 4 by means of a threaded fitting 36. Though the hole 34 can be provided directly in the wall 26, in the embodiment of the invention illustrated in FIG. 3 the hole is provided in a bushing 38 housed in an aperture in the wall. Further, since in the example shown the wall 26 is integral with the housing 21, in the side wall of the latter, which defines the chamber 29 with the wall 26, another hole is provided, closed by means of a threaded plug 37. This hole serves solely for forming the lower hole in the wall 26 and fitting the bushing 38.

FIG. 4 shows an electric circuit for control of the program unit of the machine tool. The contact mentioned above, associated with the float 33 (FIG. 3) and indicated by C in the circuit of FIG. 4, is connected in series with a relay R between a pair of inlet terminals. Two contacts $R_1$ and $R_2$, actuated by the armature of the relay R, are adapted to close, respectively, the circuit of a warning light S (or of any other indicating device) and the circuit of a flip-flop F. This flip-flop F is connected to one input of an AND gate P, whose other input is connected to the program unit U of the machine tool.

In operation, the oil contained in the reservoir 4 (FIG. 1) of the pumping station is sucked by the pump 6 through the pipe section 7 and then sent, through the pipe sections 9 and 10, to the delivery piping 2. Along this path the oil is subjected to two filtrations, i.e., a first coarse filtration through the filter 5 and subsequently a fine filtration through the filter 11. During the operation of the pump, a portion of the oil flows, through the small tube 14, into the indicator 15, whose chamber 16 becomes filled with oil when the piping downstream of the pump is under pressure.

The oil, after circulating in the operating heads of the machine tool, flows back in the reservoir 4 through the return piping 3 which opens into the control device 20.

The oil flows first into the chamber 27 (FIG. 3), inside which the separation of any contaminating metal particles takes place, these particles being attracted by the magnetic plug 32. Then, by flowing through the hole 30, the oil completely fills the chamber 28, from which it flows into the chamber 29, through both the hole 31 and the hole 34. When the chamber 28 is completely filled with oil, this condition occurring when the rate of flow of the oil in the circuit reaches its maximum value, the float 33 will be lifted, thereby opening the corresponding contact C (FIG. 4). As a result, no current will reach the relay R and therefore the contacts $R_1$ and $R_2$, actuated by the armature of the relay, will be open. In these conditions, the warning light S is not illuminated and no signal will reach the input of the gate P connected to the flip-flop F.

The diameters of the holes 31 and 34 are chosen so as to permit passage therethrough of the whole rate of flow at the working pressure of the oil, which flows through the circuit comprising the pumping station 1, the operating head and the oil delivery and return pipings 2 and 3. The hole 34 is dimensioned so that a fraction of the whole rate of flow of the oil will pass therethrough, which is sufficient for a lubrication which will permit performance of the longest working cycle of the machine without any inconvenience. For this purpose it has been found suitable to have a flow of oil through the hole 34 which is equal, for instance, to about 35 percent of the total rate of flow.

Assuming that the rate of flow of the oil in the circuit decreases, for instance due to clogging of the filters 5 or 11, to an obstruction of the pipings upstream of the device 20 or to leakages of the pipings, the oil level in the chamber 28 will fall. If the rate of flow is reduced to a considerable degree, it willpass solely through the hole 34. As soon as the oil level in the chamber 28 has reached the lower edge of the hole 31 (initial rate of flow reduced by 65 per cent), the lowering of the float 33 causes the contact C to be closed (FIG. 4).

The relay R is then energized and its armature closes the contacts $R_1$ and $R_2$, the first of which causes lighting of the warning lamp S while the second sets the flip-flop to apply a signal to the gate P. No signal is yet emitted by this gate, because the other input thereof has not yet been energized.

The rate of flow still circulating in the circuit (which is equal to 35 per cent of the total rate of flow in the present example) is sufficient for completion of the working cycle under course. Upon completion of this cycle, the program unit U of the machine will feed a signal to the gate P which, due to the energization of the other input thereof, will emit a signal $S_B$ which arrests the operation of the unit.

Therefore, the control device is adapted both to indicate the instant when the oil rate of flow drops below a predetermined value which is insufficient to obtain an efficient lubrication but still sufficient to carry out a complete working cycle, and to arrest the program unit upon completion of the cycle.

I claim

1. A machine lubrication system for sending lubricant along a closed flow path, said machine being adapted to effect several working cycles, said system comprising:

a first chamber of predetermined capacity having first and second discharge of openings, said first discharge opening being of such size as to allow therethrough a predetermined rate of flow sufficient for proper machine lubrication for the longest working cycle of the machine, a second chamber in communication with the machine and with said first chamber for admitting lubricant to said first chamber, a third chamber in communication with said first and second discharge openings and in communication with said reservoir for admitting lubricant to said reservoir, lubricant level sensing means comprising a float in said first chamber, and signal means responsive to a decrease in the rate of flow of said lubricant comprising a switch operated by said float whenever the lubricant level in said first chamber is below said second discharge opening.

2. A machine lubrication system according to claim 1 wherein said second discharge opening is located in a plane above said first discharge opening.

3. A machine lubrication system for sending lubricant along a closed flow path, said machine being adapted to effect several working cycles, said system comprising:

a chamber of predetermined capacity having first and second discharge openings, said first discharge opening being of such size as to allow therethrough a predetermined rate of flow sufficient for proper machine lubrication for the longest working cycle of the machine, lubricant level sensing means comprising a float in said chamber, signal means responsive to a decrease in the rate of flow of said lubricant comprising a switch operated by said float whenever the lubricant level in said chamber is below said second discharge opening, and a program unit for controlling the machine, said program unit generating at the end of each machine cycle an end-of-cycle signal and being capable of arresting the operation of the machine in response to an arresting signal, said program unit comprising a relay circuit actuated by said switch, a visual signal switch enabled by said relay circuit for operating a visual signal, and an AND gate having a first input enabled by said relay circuit and a second input comprising said end-of-cycle signal, said AND gate generating an output arresting signal upon receipt of said first and second inputs for arresting the operation of said machine.

4. A machine lubrication system for sending lubricant along a closed flow path, said machine being adapted to effect several working cycles, said system comprising:
  a chamber of predetermined capacity having first and second discharge openings, said first discharge opening being of such size as to allow therethrough a predetermined rate of flow sufficient for proper machine lubrication for the longest working cycle of the machine,
  lubricant level sensing means comprising a float in said chamber,
  signal means responsive to a decrease in the rate of flow of said lubricant comprising a switch operated by said float whenever the lubricant level in said chamber is below said second discharge opening, and
  a program unit for controlling the machine, said program unit generating at the end of each machine cycle an end-of-cycle signal and being capable of arresting the operation of the machine in response to an arresting signal, said program unit comprising an AND gate having a first input from means operated by said switch and a second input comprising said end-of-cycle signal, said AND gate generating an output arresting signal upon receipt of said first and second inputs for arresting the operation of said machine.

* * * * *